(12) United States Patent
Cook

(10) Patent No.: US 7,756,022 B1
(45) Date of Patent: Jul. 13, 2010

(54) SECURE HIDDEN ROUTE IN A DATA NETWORK

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 148 days.

(21) Appl. No.: 12/052,150

(22) Filed: Mar. 20, 2008

Related U.S. Application Data

(62) Division of application No. 10/390,250, filed on Mar. 17, 2003, now Pat. No. 7,394,756.

(51) Int. Cl.
 *G01R 31/08* (2006.01)
 *G06F 15/16* (2006.01)
(52) U.S. Cl. .................. 370/229; 370/216; 709/203
(58) Field of Classification Search .................. None
 See application file for complete search history.

(56) References Cited

U.S. PATENT DOCUMENTS

| | | | |
|---|---|---|---|
| 6,222,839 B1 * | 4/2001 | Nakazaki et al. ............ | 370/352 |
| 6,735,190 B1 | 5/2004 | Chuah et al. | |
| 6,765,921 B1 | 7/2004 | Stacey et al. | |
| 6,901,048 B1 | 5/2005 | Wang et al. | |
| 7,420,988 B1 * | 9/2008 | Grossman .................. | 370/466 |
| 2001/0003522 A1 * | 6/2001 | Masuhiro .................. | 370/237 |
| 2001/0046227 A1 | 11/2001 | Matsuhira et al. | |
| 2002/0176359 A1 * | 11/2002 | Durinovic-Johri et al. .. | 370/229 |
| 2003/0012189 A1 | 1/2003 | Nomura et al. | |
| 2003/0016628 A1 * | 1/2003 | Kadambi et al. ............ | 370/235 |
| 2003/0043745 A1 | 3/2003 | Kano et al. | |
| 2003/0043792 A1 | 3/2003 | Carpini et al. | |
| 2003/0063613 A1 | 4/2003 | Carpini et al. | |
| 2003/0065711 A1 | 4/2003 | Acharya et al. | |
| 2003/0177212 A1 * | 9/2003 | Givoly et al. ............... | 709/223 |
| 2004/0028054 A1 | 2/2004 | Khurana et al. | |
| 2004/0196843 A1 | 10/2004 | Zinin | |
| 2004/0213221 A1 | 10/2004 | Civanlar et al. | |
| 2005/0223096 A1 * | 10/2005 | Shinkai ..................... | 709/225 |
| 2006/0050719 A1 | 3/2006 | Barr et al. | |
| 2006/0178994 A1 | 8/2006 | Stolfo et al. | |

OTHER PUBLICATIONS

Cynthia Kocialski, A Primer on MPLS From Label to Lambda Switching, Vesta Corporation, May 2000, pp. 1-9.
Martin, et al., Transport of Layer 2 Frames Over MPLS, Network Working Group, Aug. 2002, pp. 1-20.
Mirkovic, et al., A Taxonomy of DDoS Attacks and DDoS Defense Mechanisms, Technical Report #020018, University of California, Los Angeles, pp. 1-12, Apr. 2004.

* cited by examiner

*Primary Examiner*—Hong Cho
*Assistant Examiner*—Hicham B Foud

(57) ABSTRACT

A hidden pathway to a host is provided in an internetwork having an egress router coupled to the host. A selected port of the egress router is connected to the host as a hidden access port. A label table in the egress router is configured to associate the selected port with a predetermined label. Distribution of the predetermined label is restricted to one or more controlled access points so that access to the hidden pathway is restricted to the controlled access points. The controlled access points may reside at the users themselves, but are preferably contained within proxy devices coupled to the internetwork using secure connections.

6 Claims, 4 Drawing Sheets

SECURE HIDDEN ROUTE IN A DATA NETWORK

CROSS REFERENCE TO RELATED APPLICATIONS

This is a divisional application of U.S. Ser. No. 10/390,250, filed Mar. 17, 2003, entitled "Secure Hidden Route in a Data Network", now U.S. Pat. No. 7,394,756, issued Jul. 1, 2008.

STATEMENT REGARDING FEDERALLY SPONSORED RESEARCH

Not Applicable.

BACKGROUND OF THE INVENTION

The present invention relates in general to data network communication using routers to provide a secure access channel to authorized users, and, more specifically, to maintaining availability of a host computer to high priority users during times that excessive traffic or a malfunction would otherwise disrupt access.

Communications within TCP/IP-based data networks is of the connectionless type. In order to send computer data signals from one computer to another, the data signals are fragmented into packets. Each network packet is tagged with routing information such as a source address (of the originating computer) and a destination address (of the recipient computer). In the event that the destination address is not in the local network, it must typically be passed through one or more routers in order to reach the local network of the recipient. At the receiving end, the packets are reassembled into the intended communication signals.

A router typically includes a plurality of ports or interfaces, with each port or interface being connected to a respective local network or to another router. When a router receives a particular packet at one port, the packet is examined in order to determine which of the other ports it should be sent out from (if any). The most basic method, one which is currently used to handle most network traffic within the Internet, depends on routing tables maintained in each router. The destination IP address is compared to information in a routing table which maps IP addresses in various remote networks to respective ports of the router. Since any particular destination is potentially reachable by many different paths through the interconnected routers making up the internetwork, least-cost algorithms are employed in each router to determine the next hop to an adjoining router that a packet should take toward its final destination. Routers exchange status information that is maintained in each router for use in determining the best routes.

A more recent type of routing employs label switching wherein a routing path is determined prior to any particular packet reaching the beginning of the path (i.e., the ingress router). Instead of using an IP address, a label for the label switched path (LSP) is added to the packets according to the predetermined series of routers in the path. The label is examined at each hop in the path and compared to information from a label table maintained in each router to determine the destination port. At the last router in the LSP (i.e., the egress router), routing typically reverts to use of a routing table based on IP addressing.

Label switching is typically used in creating virtual private networks (VPN's) and to create channels for providing class of service (CoS). A primary example of conventional label switching is multi-protocol label switching (MPLS). Due to the administrative requirements to create and maintain a label switched path, LSP's are typically limited to operation within a particular network domain which is administered by a single entity. Routing of packets between network domains is normally handled using standard IP routing. Routing of traffic between most users and publicly-oriented web sites (e.g., search engines, news and weather sites, and merchant sites) also depends almost entirely upon standard IP routing.

Network-originated traffic routed to a particular host computer within a respective local network (using either label switching or standard IP addressing) must pass through a router directly connected to that local network (i.e., a border router). There is typically only one or a small number of border routers through which the host can be reached from a remote network. Overloading (i.e., flooding) of the border router(s) or other malfunctions can prevent or greatly slow down attempted connections to the host. Such flooding can result from a distributed denial of service (DDoS) attack, for example, wherein an attacker breaks into a large number of individual computers connected to the internetwork and places an attack program on them. The attack programs simultaneously transmit bogus data traffic to the host victim, resulting in a flood of network traffic at the border router, or other shared network resource (sometimes the access link, or traffic shaper, or other shared resource), which overwhelms the processing capacity of the router and denies access of legitimate users to the host.

SUMMARY OF THE INVENTION

The present invention has the advantages of maintaining traffic flow within an network to a host system for certain high priority users during a flood condition and of diverting or blocking unauthenticated traffic creating the flood condition. The invention provides routing of traffic from known sources (i.e., users) which is different from the routing of unknown sources (at least during a flood condition). The known sources are given access to a "hidden route" that is created using label switching that points to a hidden port of the egress router that can only be reached by a label switched path.

In one aspect of the invention, a method provides a hidden pathway to a host in an internetwork having an egress router coupled to the host. A selected port of the egress router is connected to the host as a hidden access port. A label table in the egress router is configured to associate the selected port with a predetermined label. Distribution of the predetermined label is restricted to one or more controlled access points so that access to the hidden pathway is restricted to the controlled access points. The controlled access points are contained within proxy devices coupled to the internetwork using secure connections.

DETAILED DESCRIPTION OF PREFERRED EMBODIMENTS

Figure 1:
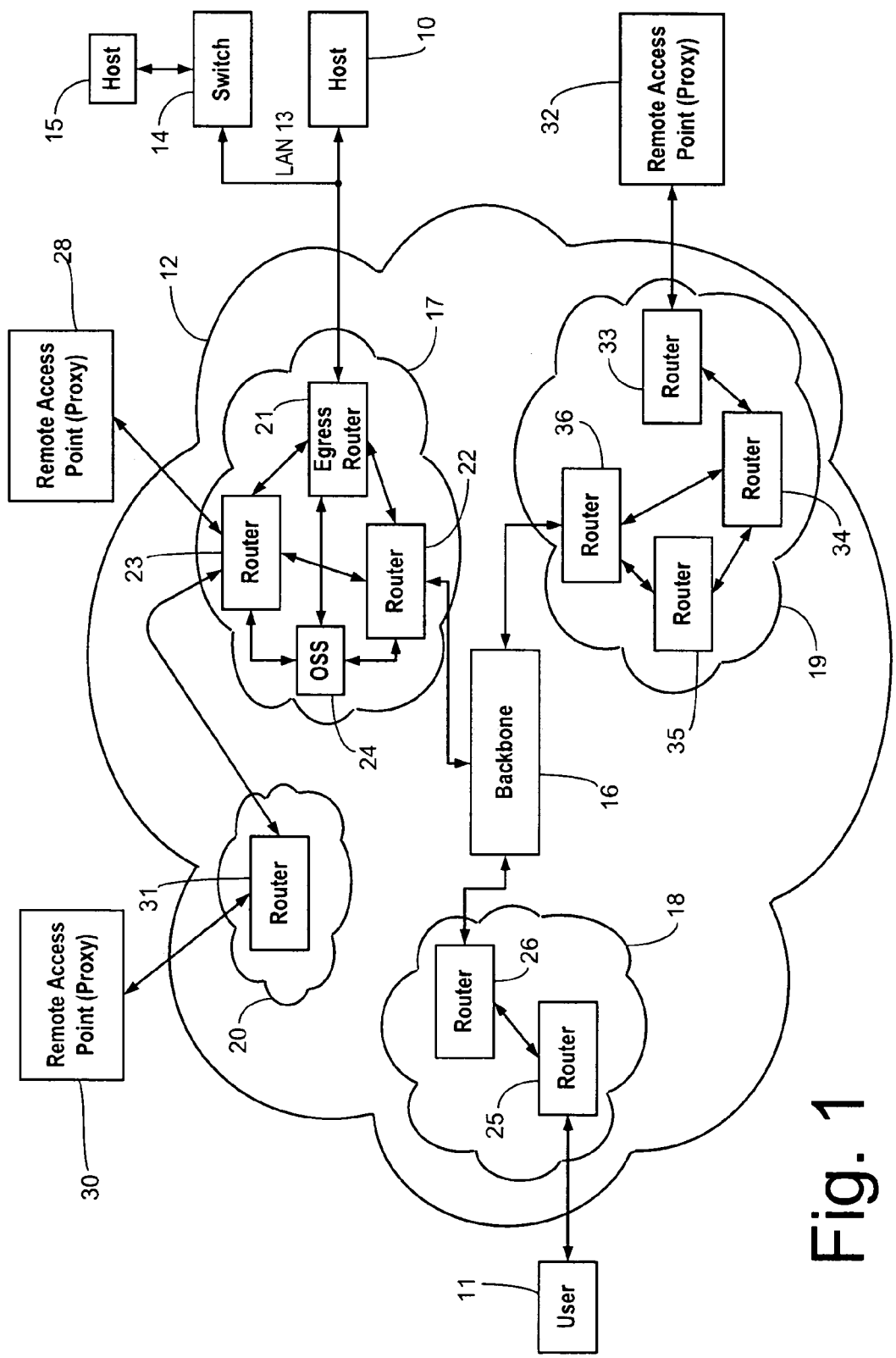
FIG. 1 is a block diagram showing one preferred network architecture for implementing the present invention.

Referring to FIG. 1, the present invention creates a hidden route between a host 10 and a user 11 through an internetwork 12 wherein the hidden route can be used at any time to provide a restricted access channel to host 10 or can be used as an alternate communication channel for authorized users when a public channel becomes flooded or otherwise impaired due to a malfunction or a deliberate attack. Internetwork 12 preferably comprises the Internet. In addition to an internetwork, the present invention could also be used in other wide area networks (WAN) such as a corporate or university intranet.

Host 10 may be connected as part of a local area network (LAN) 13 containing other hosts, hubs, or switches, such as a switch 14 and a host 15. LAN 13 may also include a gateway and/or a modem (not shown), such as a DSL or cable modem, for connecting to internetwork 12.

Internetwork 12 includes a backbone 16 for carrying network traffic between network domains such as domains 17, 18, and 19. Another domain 20 is connected indirectly to backbone 16 via network domain 17. Other arrangements are possible for connecting domains and backbone resources, and the present invention can be implemented in each of these other arrangements. FIG. 1 is merely one example of the integration of the present invention into a network.

LAN 13 containing host 10 is coupled to network domain 17, which may comprise the domain of an Internet service provider (ISP), for example. An egress router 21 in domain 17 is coupled to LAN 13 and carries all remote network traffic to and from host 10. Domain 17 includes other interconnected routers such as router 22 which is connected to backbone 16 and router 23 which is connected to a router 31 in domain 20. An operational support system 24 is connected to routers 21-23 and exercises supervisory control over their operation, as is known in the art.

In the present invention, egress router 21 is the point where a label switched path egresses into a hidden portal leading to host 10. Since it is also connected to the edge of LAN 13, egress router 21 is also a border router in the illustrated embodiment. Other embodiments are possible wherein the egress router is not directly connected to LAN 13, but is coupled to it through one or more other routers.

User 11 is coupled to a router 25 in domain 18. A gateway and a DSL, cable, or dial-up modem (not shown) are preferably used to connect user 11 to domain 18. Another router 26 in domain 18 provides a link to backbone 16, allowing user 11 to communicate with other portions of internetwork 12.

As described in more detail below, a label switching mechanism is employed between egress router 21 and host 10 to create a limited access or "hidden" channel for remotely sending network packets to host 10. A predetermined label which is configured into egress router 21 must be used to access the hidden door (i.e., port) thereby creating a hidden route that leads to host 10. In a preferred embodiment, one or more remote access points within internetwork 12 are provided with knowledge of the predetermined label. A user that authenticates to a remote access point can have their network packets relayed by the access point to host 10 using the predetermined label. The use of such access points avoids a widespread distribution or sharing of the predetermined label, thereby increasing security. Alternatively, the predetermined label can be distributed to trusted users so that the trusted users can communicate with host 10 without relaying through an access point, if desired.

A remote access point or proxy device 28 is coupled to router 23 in domain 17. Proxy devices 30 and 32 are coupled to routers 31 and 33 in domains 20 and 19, respectively. Each proxy functions as a secure gateway to the hidden route and each one comprises a relaying workstation that may preferably require authentication and authorization of an accessing user. User 11 receives address information of a proxy device from host 10 via a public, unrestricted channel to host 10 prior to any flooding or other unavailability of host 10, or from a mirror device or advertisement for host 10.

Figure 2:
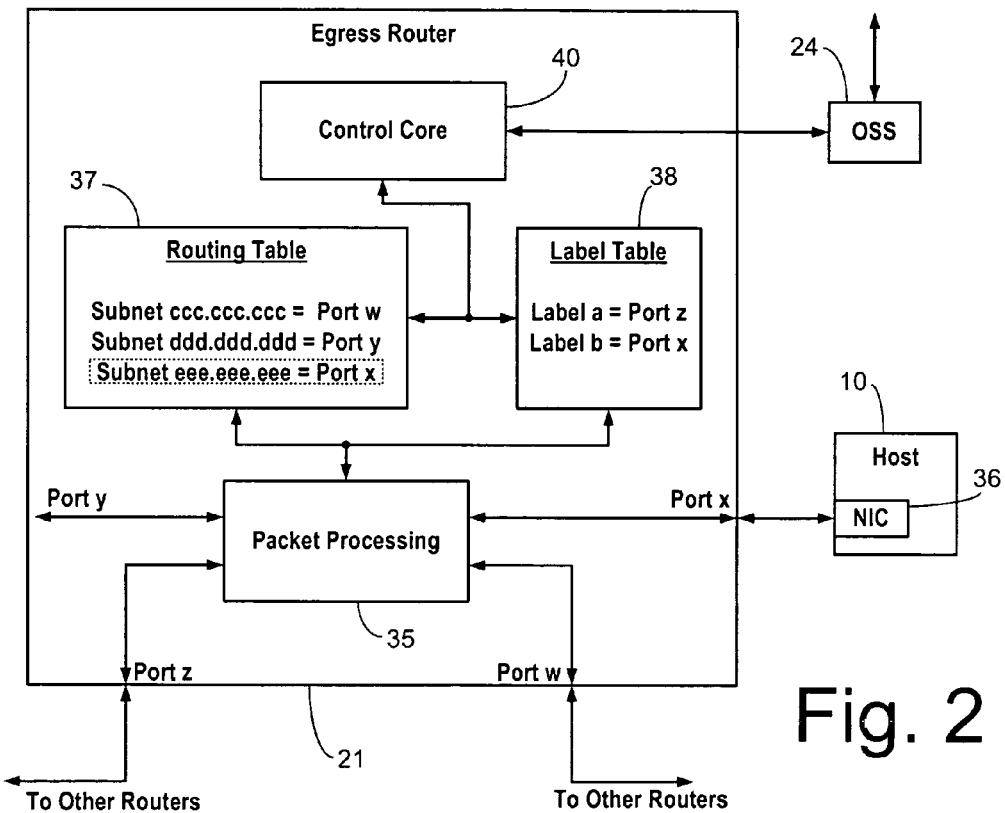
FIG. 2 is a block diagram showing an egress router of one embodiment of the invention.

As shown in FIG. 2, egress router 21 includes a packet processing block 35 that examines incoming packets and decides which, if any, of its input/output ports (i.e., ports w, x, y, or z) to forward them to based on either a routing table 37 or a label table 38. Host 10 includes a network interface 36 which is coupled to port x of router 21. A router control core 40 is coupled to OSS 24.

Using normal IP addressing based on routing tables, the destination address contained within an incoming packet is compared with network or subnetwork addresses in routing table 37 to identify the appropriate forwarding port. In this example, the IP address of host 10 is any arbitrary address such as 65.173.211.241, represented generically herein as eee.eee.eee.eee. During normal (i.e., pre-flood) conditions, an entry in routing table 37 identifies port x as the port to which packets having the destination address eee.eee.eee.eee are forwarded. Thus, the routing table provides a public traffic channel which is generally accessible to anyone having the destination address of host 10 (e.g., as obtained from a DNS lookup of a logical name such as www.sprint.com).

Optionally, host 10 may be set up such that users within the public traffic channel can register as an authorized user of an alternative or backup connection method (i.e., a limited access channel or hidden port). Access to the alternative channel employs certain elements of known label switching protocols to route packets using label table 38 even though there is not an actual label switched path to be used. After identifying a validating a user during registration, host 10 transfers the address data necessary to access the restricted channel (either directly or through a proxy device). Alternatively, the user or the proxy device can be manually configured (e.g., locally by an administrator) without requiring registration.

Access to the restricted channel is controlled via label table 38 which is configured with a predetermined label (e.g., label b) providing a pointer to port x. This pointer may also include the IP address of host 10 depending upon the protocols used. Multi-Protocol Label Switching (MPLS) protocol may preferably be used in the present invention. Packet labeling of the present invention uses known techniques such as described in the Internet Draft titled "Transport of Layer 2 Frames Over MPLS", available from the website of the Internet Engineering Task Force in a file "draft-martini-l2circuit-trans-mpls-10.txt", for example.

To use the limited access channel to host 10, a packet is labeled with the predetermined label at a labeling point (e.g., the proxy device or the user) and then sent to egress router 21 where the predetermined label is identified and used to forward the packet through the limited access channel.

Whenever port x is listed in routing table 37, the port itself is not hidden (although the access via label table 38 is hidden from everyone except the authorized users and proxy devices). When a traffic flood condition occurs, however, routing table references that lead to port x can be modified in order to both hide port x and to alleviate the flood condition at egress router 21. More specifically, OSS 24 monitors load levels of routers, switches, hubs, bridges, and other components within a network domain. When it senses a traffic overload of router 21, OSS 24 commands control core 40 to remove the entry in routing table 37 that points to port x. It is not typically necessary for OSS 24 to detect the actual destination of the packets creating an overload since egress router 21 is typically a border router for host 10 and it is likely that a flood condition is being caused by incoming traffic that is directed to an edge network and is being concentrated at egress router 21. OSS 24 and/or router 21 may also communicate with other routers to modify their routing tables to block or divert the flooding traffic away from router 21. For example, OSS 24 may send provisioning or control messages to other routers and switches in the domain informing them that router 21 is unreachable, causing the other routers and switches to drop any packets destined for router 21. Alternatively, OSS 24 may instruct the other routers to remove their routes to the host's IP address or to re-direct that particular route to another port destination (e.g., a dummy destination, a discard destination, or a security system destination for analysis of the traffic).

Figure 3:
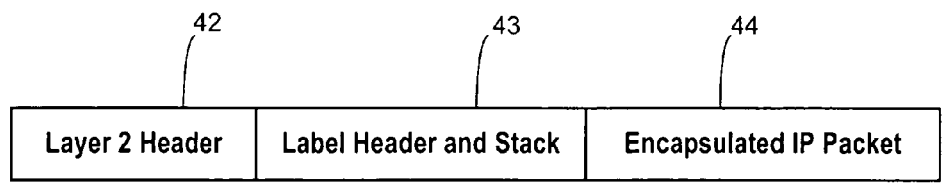
FIG. 3 shows various parts of a network packet that is sent using one preferred embodiment.
Figure 4:
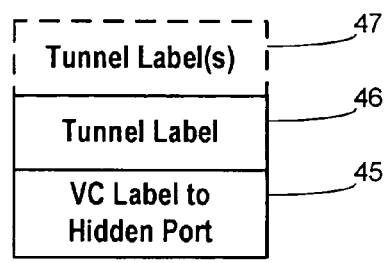
FIG. 4 shows a label stack used in network packets of one preferred embodiment.

A packet 41 sent out by a labeling point is shown in FIG. 3. In one preferred embodiment, packet 41 is generated at a proxy device having the appropriate labeling information. Packet 41 is formatted according to the MPLS protocol and includes a layer 2 header 42, a label header and stack 43, and a payload or encapsulated IP packet 44. The predetermined label used at the egress router to direct the packet to the hidden port must be applied to the packet and then preserved as the packet is modified by routers during its forwarding to the egress router. FIG. 4 shows the label stack wherein the predetermined label to the hidden port is contained as a virtual circuit (VC) label 45 at the bottom of the label stack. In the event that label switching is used for any portion of the routing path taken by the packet from the labeling point to the egress router, one or more tunnel labels 46 and 47 may be applied to and removed from the stack as the packet progresses.

Figure 5:
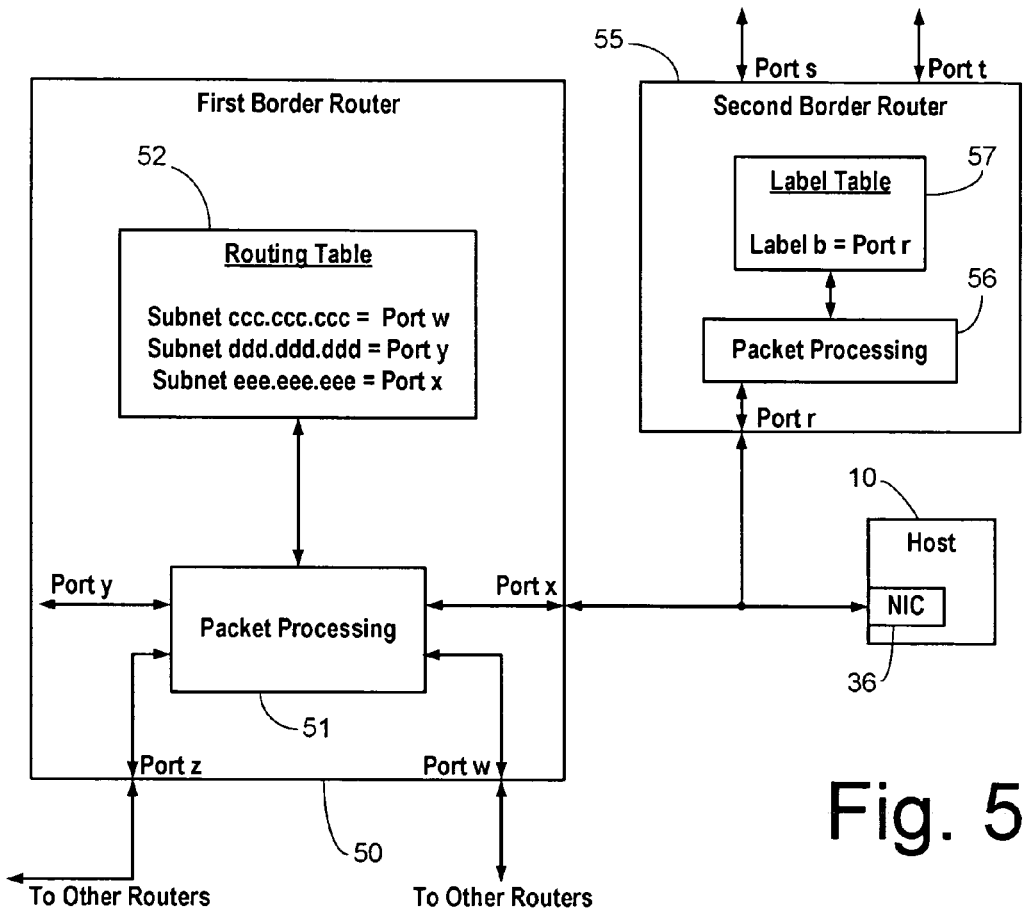
FIG. 5 is a block diagram showing first and second border routers in another preferred embodiment of the invention.

In the embodiment of FIG. 2, after routing tables are modified to remove routes to router 21, an LSP may preferably be used between the labeling point and router 21. A proxy device that is located more remotely from the host domain may sometime be desirable, however, because it is less affected by the flood condition and is harder to discover and attack. Since the flooding traffic all uses the existing IP address "eee.eee.eee.eee", a substitute or backup IP address may be needed for leading to the egress router. FIG. 5 shows an embodiment wherein a first border/egress router 50 and a second border/egress router 55 are coupled to host 10 and LAN 13 so that the egress router of the limited access channel is not the same as the egress router of the public traffic channel. Specifically, first border router 50 provides the public traffic channel and second border router 55 provides the limited access channel. Thus, the labeling point utilizes an alternate IP address that is set up within routing tables to point to second border router 55. Preferably, this alternate IP address is not contained in any DNS lookup tables so that the limited access channel remains secure.

First border router 50 includes a packet processing block 51 that consults routing table 52 in order to forward packets with a destination address eee.eee.eee.eee of host 10 to port x. In a flood condition, it is preferable to detect the condition and to remove the corresponding routing table entry, but this is not necessary in order to the limited access channel through second border router 55 to continue to work. Second border router 55 includes a port r coupled to LAN 13 and host 10. A label table 57 associates predetermined label b with port r. When a packet that was directed to the alternate IP address is received, the presence of the label is detected and label table 57 is consulted in order to determine that the packet should be output via port r. The packet may be output having the actual IP address of host 10 inserted therein.

Rather than using two border routers, it is alternatively possible to continue to use the single egress router 21 if 1) routing tables are changed so that flood traffic is diverted away from egress router 21 and 2) the labeling point sends the labeled packets to egress router 21 in the routing tables.

Figure 6:
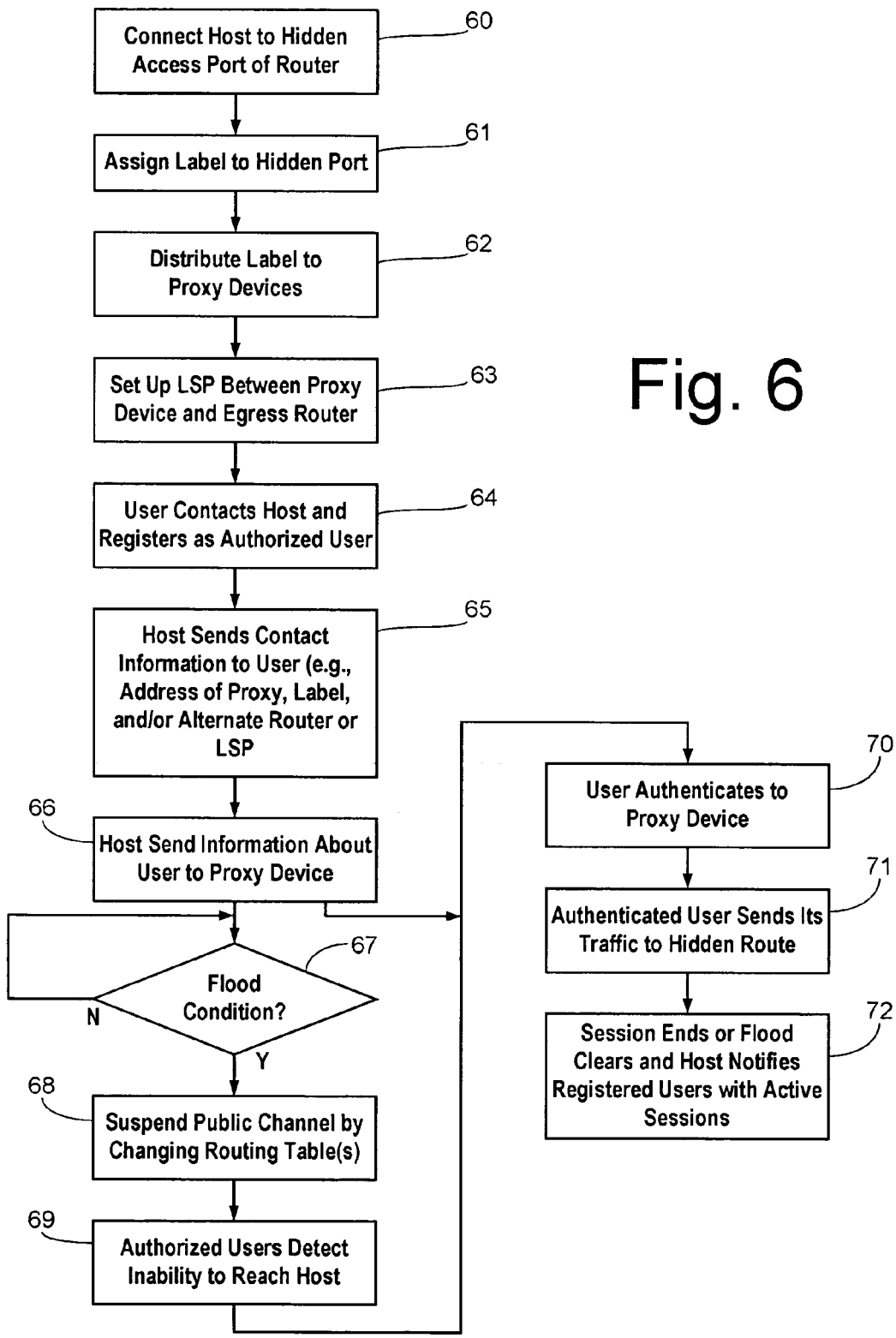
FIG. 6 is a flowchart showing a preferred method of the invention.

A preferred method of the present invention is shown in FIG. 6. In step 60, the protected host (or its local area network or gateway or modem) is connected to a predetermined ("hidden") port of the egress router. A predetermined label is assigned to the hidden port and is stored in a label table of the egress router in step 61. In step 62, the predetermined label is distributed to the labeling points, such as the proxy devices that may be used to control access via the hidden port. In the preferred embodiment, a label switched path is set up between each proxy device and the egress router in step 63 to complete a routing path that will not be affected by any changes to routing tables if a flood condition occurs at the egress router.

After this basic setup is completed, users may contact the host and register as authorized users in step 64 via a public traffic channel employing DNS-based IP addressing. Any desired level of authentication, authorization, and accounting measures can be employed in the registration process, depending upon the desired level of security and other objectives. Upon successful registration, the host sends appropriate contact information to the user to allow the user to access the limited access traffic channel to the host in step 65. In a preferred embodiment using proxy devices, this contact information provided to the user comprises an IP address of the host and any protocol or application information necessary to create and send network packets to the proxy device for relaying to the host. Based on the authentication/authorization information collected during registration, the host sends authentication and authorization information about the user to one or more proxy devices in step 66.

If a proxy device is not being used, the contact information sent to the user in step 65 can alternatively comprise the predetermined label together with identification of a label switched path to the egress router or an IP address for an alternate egress router.

In either embodiment, it is possible to allow immediate access via the limited access channel as shown by a direct path from step 66 to step 70. Alternatively, the public channel may continue to be used until a flood condition or other overload or malfunction occurs in the public channel. Thus, a check is made in step 67 to determined whether a flood condition exists. This check can be made by the OSS, for example. If a flood condition does exist, then the public traffic channel is suspended in step 68 by changing one or more routing tables as necessary to divert traffic away from the desired egress router. Any authorized users attempting contact with the host via the public traffic channel will then be notified within their own networks that the desired host is unreachable. In response, the user can switch to their known back-up of using the limited access channel to contact the host.

In step 70, the user contacts the proxy device using the IP address and/or other contact information provided earlier and then authenticates with the proxy device to receive permission for relaying packets via the limited access channel. Preferably, a secure channel may be used between the user and the proxy device, such as an IPsec channel.

The authenticated user sends its traffic of network packets into the hidden route via the proxy device (or directly if no proxy device is being used) in step 71. In step 72, use of the hidden, limited access channel terminates when the user session ends. In addition, it is possible to detect a clearing up of the flood condition and then notify registered users having active sessions that the public traffic channel is available.

What is claimed is:

1. A method of providing a hidden pathway to a host in an internetwork, wherein the internetwork has a plurality of routers including an egress router that is coupled to said host, wherein each router includes a plurality of ports and a routing table for associating destination addresses with respective ports, and wherein the egress router includes a label table for associating labels with respective ports, said method comprising the steps of:
- connecting a first port of at least one of the routers to said host;
- configuring at least one routing table to associate a public address of said host with said first port;
- connecting a selected port of said egress router to said host as a hidden access port;
- configuring said label table in said egress router to associate said selected port with a predetermined label;
- restricting distribution of said predetermined label to one or more controlled access points so that access to said hidden pathway is restricted to said controlled access points;
- monitoring traffic directed to said host node using IP address routing with an operational support system coupled to said egress router;
- detecting an overload condition of said traffic; and
- suspending operation of said IP address routing in response to said overload condition, whereby only packets directed to said hidden port are received by said host node.

2. The method of claim 1 further comprising the step of:
- said access point directing traffic to said hidden pathway by appending both said predetermined label and internetwork routing information of said egress router to network packets destined for said hidden pathway.

3. The method of claim 2 wherein said internetwork routing information is comprised of a label switched path including an ingress label, said ingress label being stacked above said predetermined label in a label routing protocol.

4. Apparatus for conveying network traffic composed of packets sent in an internetwork, comprising:
- a host node;
- an egress router coupled to said internetwork and having a selected port coupled to said host node as a hidden port, said egress router including a label table configured to associate said selected port with a predetermined label, and said egress router including a routing table configured to associate said selected port with internetwork routing information of said host node;
- a remote access node coupled to said internetwork and configured to direct network traffic to said hidden port by appending both said predetermined label and said internetwork routing information of said egress router to network packets destined for said hidden port; and
- an operational support system coupled to said egress router for monitoring traffic directed to said host node using IP address routing, detecting an overload condition of said traffic, and suspending operation of said IP address routing in response to said overload condition, whereby only packets directed to said hidden port are received by said host node.

5. The apparatus of claim 4 further comprising:
- a user node for sending packets to said host node via said remote access node;
- wherein said remote access node is configured to recognize at least one authorized user and to forward packets to said hidden port only from an authorized user.

6. The apparatus of claim 4 wherein said internetwork routing information of said egress router is comprised of a label switched path including an ingress label, said ingress label being stacked above said predetermined label in a label routing protocol.

* * * * *